(No Model.)
W. R. STORY.
SPHERICAL BLACKBOARD.
No. 379,914. Patented Mar. 20, 1888.
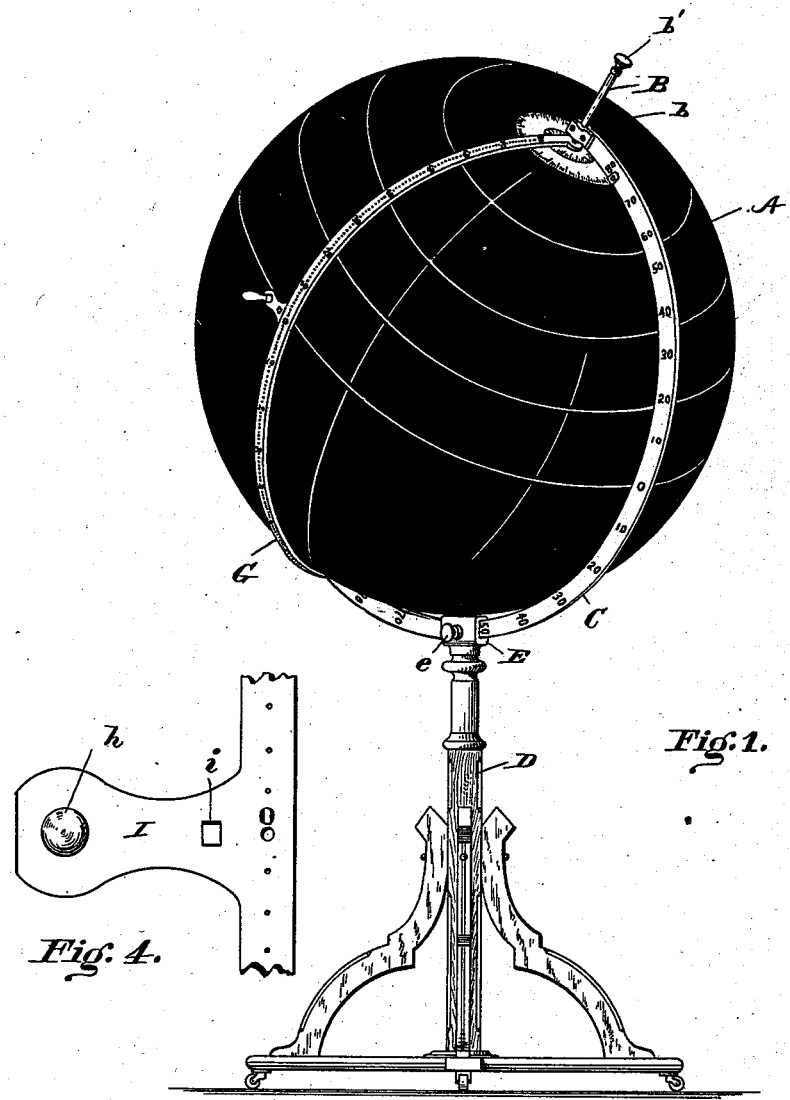
Fig. 1.
Fig. 4.
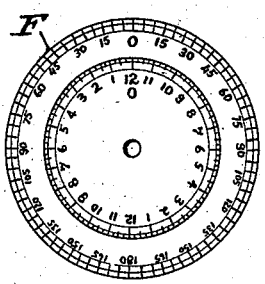
Fig. 2.
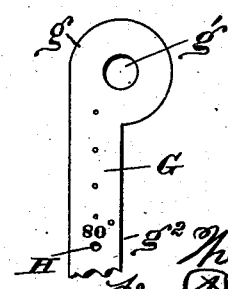
Fig. 3.
Attest.
C. W. Bogart,
W. H. Ruse.
Inventor.
William R. Story
per Strehli and Hill,
Attys.

UNITED STATES PATENT OFFICE.

WILLIAM R. STORY, OF CINCINNATI, OHIO, ASSIGNOR TO EDWIN S. HAVENS, OF SAME PLACE.

SPHERICAL BLACKBOARD.

SPECIFICATION forming part of Letters Patent No. 379,914, dated March 20, 1888.

Application filed October 3, 1887. Serial No. 251,372. (No model.)

*To all whom it may concern:*

Be it known that I, WILLIAM R. STORY, a resident of Cincinnati, Hamilton county, Ohio, have invented certain new and useful Improvements in Spherical Blackboards, of which the following is a specification.

The object of my invention is to provide a system of map-drawing on a spherical form or globe, the better to impress upon the mind of the pupil the location on the earth's surface of the respective political divisions and historical cities and places.

It is a well-known fact to those engaged in teaching geography that it is almost impossible to impress upon the mind of the pupil from maps on a flat surface the location of the different countries and cities on the earth's surface. In order to do this from an ordinary map, it is necessary for the pupil to commit to memory the exact latitude and longitude of every important place on the globe and keep them in mind; hence it is that very few, comparatively, can locate any country or place on the earth's surface with any degree of accuracy. It is also conceded and admitted that there is no method of teaching geography that is so replete with success as by map-drawing; but the difficulty has been to teach the pupil to accurately draw the curved parallel and meridian lines on a flat surface and to impress upon the mind of the pupil the work he has drawn. The mere copying of a map, with the parallel and meridian lines thereon, on a flat surface does not have a lasting impression upon the mind of the ordinary pupil.

It is claimed that by the use of my method of drawing on a blackboard of a spherical form to represent the configuration of the earth, and suitable apparatus connected thereto, as hereinafter described, for correctly drawing the parallel and meridian lines thereon, and having the pupil do this for himself, better results can be obtained than by the old system of map-drawing. Starting with any prime meridian, the pupil is taught that time is computed east or west from said point and that certain imaginary lines, called "parallels" and "meridians," represent a certain distance east or west, north or south. By having the pupil draw these lines for himself, with proper explanations, and then map in the different countries from these lines, it can be readily seen that the effect cannot fail to have a lasting and beneficial result.

In the accompanying drawings, forming part of this specification, Figure 1 is a perspective view of a spherical blackboard with attachments. Fig. 2 is a top view of the dial with the degrees and hours marked thereon. Fig. 3 is a view in elevation of one end of the divider. Fig. 4 is a view in elevation of an extension at the center of the divider.

A represents the spherical blackboard, such as employed in connection with my invention, which may be made of any suitable material, papier-maché preferred. The outer surface of this sphere or globe is covered with a suitable coat of slating or other marking-surface, a black surface being preferred, as it is less easily soiled. When mounted as shown in the drawings, the axial rod B extends through the center of the sphere, ends of divider G, dial F, and bearings $b$. These bearings are located in the ends of the arc-standard C, and may be constructed in any desired operative manner. The lower bearing, when mounted as shown, is preferably screw-threaded to engage the screw on the lower end of rod B. To the top of this rod B is secured the thumb-nut $b'$, for rotating said rod.

To the top of stand D is secured bearing-block E, through which the standard C passes and is secured. In the side of this block E is secured the thumb-screw $e$, for setting this standard and the globe at any desired angle.

The dial F, on which the degrees and hours are marked, is suitably secured to the axial rod B, or in the top of the spherical blackboard, as may be desired, the same object being accomplished in either way.

The divider D is semicircular, and is secured, in the present illustrative instance, to the globe by having the axial rod B pass through the opening $g'$ in shank $g$. This opening $g'$ is so located that the straight edge $g^2$ of the divider G will be on a line with the center of the opening $g'$. This divider has made in it the holes H, which correspond to and represent the degrees of latitude north and south, and in the drawings they are marked off into single degrees, but are numbered into ten degrees each. To the center of this divider is attached the handle h, which in the present instance is attached to an extension, I, of said divider. This extension I may be used in place of the dial F, and when so used is constructed as follows: The opening i is intended to represent one degree of longitude, and from the outer inside of this opening to the end of extension I is intended to represent five degrees; but for mathematical accuracy the dial is preferred for marking the degrees of longitude east and west.

Instead of being mounted on a stand, as shown, the globe may be mounted in any suitable manner, or suspended from the ceiling by a pulley, and yet be operative.

The operation of my device is as follows: Starting with the prime meridian marked on the dial, the divider G is so placed that the edge $g^2$ of said divider will be on a line with the degree desired on the dial, (every fifteen degrees representing one hour of time,) and a straight line is drawn around the globe from north to south. If the extension I is used in place of the dial F, the desired number of degrees are marked off on the equator, in the manner afore described, and the longitudinal lines drawn from said marks; but, as stated, the dial is preferred for this purpose.

To draw any of the parallel degrees north and south of the equator, a suitable pointed pencil is placed in the hole H of the divider G, which represents the degree desired, and the globe is then rotated or the divider passed around the globe. In this manner the parallel and meridian lines can be drawn with absolute correctness.

The advantages of my device have been partially set forth. It is cheap of manufacture and will answer all purposes of the ordinary globe. By its use the location of the different countries and places of historical interest are more thoroughly impressed upon the mind of the student than can be accomplished in any other method of teaching.

What I claim as new and of my invention, and desire to secure by Letters Patent, is—

1. A spherical blackboard having its outer surface covered with a coat of slating or other suitable marking-surface, in combination with divider G, having the holes H, corresponding to the degrees of latitude north and south, and means, substantially as set forth, for attaching said divider to the sphere.

2. A spherical blackboard having its outer surface covered with a coat of slating or other suitable marking-surface, divider G, having holes H, rod B, and dial F, having the degrees and hours marked thereon, and suitable support for said sphere, as and for the purposes set forth.

3. In combination with a spherical blackboard, the divider G, having holes H, rod B, arc C, bearing-block E, thumb-screw e, and stand D, substantially as set forth.

WILLIAM R. STORY.

Witnesses:
HENRY WOOST,
O. M. HILL.